US012613564B2

(12) United States Patent
Gualniera et al.

(10) Patent No.: US 12,613,564 B2
(45) Date of Patent: Apr. 28, 2026

(54) MOTION PATTERN RECOGNITION FOR DEVICE POWER POLICIES

(71) Applicant: STMicroelectronics International N.V., Geneva (CH)

(72) Inventors: Lorenzo Francesco Gualniera, Carugate (IT); Stefano Paolo Rivolta, Desio (IT); Piergiorgio Arrigoni, Domodossola (IT); Marco Bianco, Cesano Boscone (IT)

(73) Assignee: STMicroelectronics International N.V., Geneva (CH)

( * ) Notice: Subject to any disclaimer, the term of this patent is extended or adjusted under 35 U.S.C. 154(b) by 221 days.

(21) Appl. No.: 18/478,508

(22) Filed: Sep. 29, 2023

(65) Prior Publication Data

US 2025/0110535 A1 Apr. 3, 2025

(51) Int. Cl.
| | |
|---|---|
| *G06F 1/26* | (2006.01) |
| *G01C 22/00* | (2006.01) |
| *G01C 23/00* | (2006.01) |
| *G06F 1/3206* | (2019.01) |
| *G06F 9/4401* | (2018.01) |
| *G06F 11/34* | (2006.01) |

(52) U.S. Cl.
CPC .............. *G06F 1/26* (2013.01); *G06F 1/3206* (2013.01); *G01C 22/00* (2013.01); *G01C 23/00* (2013.01); *G06F 9/4418* (2013.01); *G06F 11/3476* (2013.01)

(58) Field of Classification Search
CPC ........ G06F 1/26; G06F 1/3206; G06F 9/4418; G06F 11/3476; G01C 22/00; G01C 23/00
USPC .......................... 713/300, 323; 702/141, 150
See application file for complete search history.

(56) References Cited

U.S. PATENT DOCUMENTS

| | | | | |
|---|---|---|---|---|
| 6,049,874 | A * | 4/2000 | McClain | ................ G06Q 40/08 713/1 |
| 9,459,698 | B2 * | 10/2016 | Lee | ........................ G06F 1/3234 |
| 10,002,243 | B1 * | 6/2018 | Kumar | .................. G06F 1/3206 |
| 2013/0324152 | A1 * | 12/2013 | Lee | ................... H04W 52/0254 455/456.1 |
| 2015/0089262 | A1 | 3/2015 | Cairns et al. | |
| 2015/0227180 | A1 * | 8/2015 | Rabii | ...................... G06F 3/017 713/323 |
| 2017/0111765 | A1 | 4/2017 | Benegal et al. | |
| 2019/0129491 | A1 * | 5/2019 | Biederman, III | ..... G06F 1/3215 |

(Continued)

FOREIGN PATENT DOCUMENTS

EP          2208370 B1      6/2018

OTHER PUBLICATIONS

Culman et al., "Easing Power Consumption of Wearable Activity Monitoring with Change Point Detection," *Sensors 20*:310, 2020. (21 pages).

*Primary Examiner* — Ji H Bae
(74) *Attorney, Agent, or Firm* — Seed Intellectual Property Law Group LLP

(57) ABSTRACT

The present disclosure is directed to routine recognition for adjusting the power state of a device. Human activity recognition is performed to detect various activity states, and create a current sequence of activity states. In response to detecting a new activity state, routine comparison is performed in order to compare the current sequence to a past sequence that ended with the user starting to interact with the device. The device is preemptively turned on in response to finding a match.

16 Claims, 4 Drawing Sheets

(56) References Cited

U.S. PATENT DOCUMENTS

| | | |
|---|---|---|
| 2019/0208384 A1 | 7/2019 | Matus et al. |
| 2021/0122024 A1* | 4/2021 | Obermann ............ G06F 9/4418 |
| 2021/0255686 A1 | 8/2021 | Rivolta et al. |
| 2022/0100252 A1 | 3/2022 | Polat et al. |
| 2025/0217164 A1* | 7/2025 | Kivilinna ................ G06F 3/016 |

* cited by examiner

MOTION PATTERN RECOGNITION FOR DEVICE POWER POLICIES

BACKGROUND

Technical Field

The present disclosure is directed to context awareness for electronic devices.

Description of the Related Art

Electronic devices typically support a comprehensive and system-wide set of power management features to improve user experience, extend battery duration, save energy, and reduce heat and noise of the device. Power management features are particularly important for portable devices, such as laptops, tablets, and mobile devices, due to their limited power supply.

Power management features typically include options to transition the device between several different power states. For example, many devices support intermediate power states that are between an off state (e.g., the device is completely shut down) and an on state (e.g., the device is powered on and ready to be used by a user). Intermediate power states may include a sleep state in which the device is in a reduced power, idle state; and a hibernate state that is similar to the off state with the capability of restoring the system context when the device is turned on again. Intermediate power states allow a device to quickly return to an on state when the device is ready to be used by a user.

Many devices utilize user-defined scheduled routines to customize transitions between power states. For example, laptops utilize user-defined scheduled routines to enable or disable device features automatically at certain times of day based on absolute time information. Unfortunately, these types of user-defined scheduled routines rely on absolute time information, and have fixed schedules that cannot automatically handle deviation from the user-defined schedule due to unexpected events (e.g., unexpected delays in the user's schedule, traffic, vacations, and schedule changes). Further, user-defined schedules are often burdensome as the user has to manually configure the scheduled routines.

BRIEF SUMMARY

The present disclosure is directed to routine recognition for adjusting the power state of a device. For example, a laptop is changed from a hibernate state to an on state in response to detecting a user transporting the laptop from home to work.

Human activity recognition is performed to detect certain activity states, such as a stationary state, a walking state, and a transport state. As more activities are detected, a current sequence of activity states is created. The current sequence of activity states represents a unique signature of a user's current routine.

In response to detecting a new activity state, a routine comparison is performed in which the current sequence is compared to a database of past sequences. The database sequences are sequences in which the user has performed certain activities that ended with the user starting to interact with the device. Various techniques may be used for the comparison of sequences, such as a duration distance calculation, a unique distance calculation, and a histogram distance calculation. If the current sequence is similar or the same as a sequence in the database, the device is preemptively turned on.

Concurrently and separately from the routine comparison, the device detects when a user starts interacting with the device. If the user starts interacting with the device, the current sequence is saved into the database.

BRIEF DESCRIPTION OF THE SEVERAL VIEWS OF THE DRAWINGS

In the drawings, identical reference numbers identify similar features or elements. The size and relative positions of features in the drawings are not necessarily drawn to scale.

DETAILED DESCRIPTION

In the following description, certain specific details are set forth in order to provide a thorough understanding of various aspects of the disclosed subject matter. However, the disclosed subject matter may be practiced without these specific details. In some instances, well-known structures and methods of manufacturing electronic devices, electronic components, and sensors have not been described in detail to avoid obscuring the descriptions of other aspects of the present disclosure.

Unless the context requires otherwise, throughout the specification and claims that follow, the word "comprise" and variations thereof, such as "comprises" and "comprising," are to be construed in an open, inclusive sense, that is, as "including, but not limited to."

Reference throughout the specification to "one embodiment" or "an embodiment" means that a particular feature, structure, or characteristic described in connection with the embodiment is included in at least one embodiment. Thus, the appearance of the phrases "in one embodiment" or "in an embodiment" in various places throughout the specification are not necessarily all referring to the same aspect. Furthermore, the particular features, structures, or characteristics may be combined in any suitable manner in one or more aspects of the present disclosure.

As discussed above, many devices utilize user-defined scheduled routines to customize transitions between power states. However, such user-defined scheduled routines typically rely on absolute time information, and have fixed schedules that cannot automatically handle deviation from the user-defined schedule. Further, user-defined schedules are often burdensome as the user has to manually configure the scheduled routines.

The present disclosure is directed to devices and methods for customizing transitions between power states. A device is awakened in advance by predicting when a user typically starts interacting with the device. Actions considered indicative of a user actively interacting with the device may include lid opening, keyboard typing, docking-station plugging, power-on button pressing, etc. As a result, the user is able to interact with the device without wait or setup time (e.g., power up, resource management, device configuration, processes runtime).

Predictions are performed by recognizing patterns of activities performed multiple times by the user that terminate with the user starting to interact with the device. Activities may be detected from a human activity recognition (HAR) model based on motion sensor data, and a pattern or sequence of activities may then be used to create a unique signature of a user's routine. Detection of a particular routine, such as the user travelling from home to work, is detected by comparing the routine to routines previously stored in a database.

Figure 1:
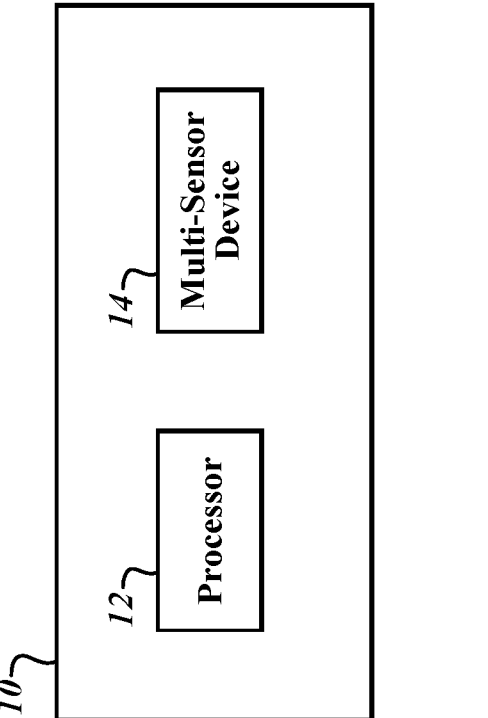
FIG. 1 is a device according to an embodiment disclosed herein.

FIG. 1 is a device 10 according to an embodiment disclosed herein.

The device 10 is an electronic device that is configured to perform pattern recognition in order to transition between power states of the device 10. The device 10 may be any type of electronic device that may benefit from context awareness for power management policies, such as laptops, tablets, mobile devices, and smart wearable devices. The device 10 includes a processor 12 and a multi-sensor device 14.

The processor 12 is a general-purpose processor that performs various functions for the device 10. For example, the processor 12 executes various applications, controls and coordinates hardware components of the device 10 and any peripheral devices communicatively coupled to the device 10, and adjusts power states of the device 10. The processor 12 may include one or more processors.

The multi-sensor device 14 is communicatively coupled to the processor 12. The multi-sensor device 14 includes one or more types of motion sensors including, but not limited to, an accelerometer and a gyroscope that generate motion measurements. The accelerometer and the gyroscope measure acceleration and angular velocity or rate, respectively, along one or more axes.

The multi-sensor device 14 also includes its own onboard memory, and a processor or processing circuitry coupled to the onboard memory. The processor is configured to receive and process data generated by the sensors; and execute programs stored in the onboard memory. The processor may include one or more processors.

In contrast to a general-purpose processor like the processor 12, the multi-sensor device 14 is a power-efficient, low-powered device, such as a smart sensor, that consumes between, for example, 100 and 300 microamps for computational requirements during processing. As such, battery life of the device 10 is improved in case the power source is a rechargeable battery.

Figure 2:
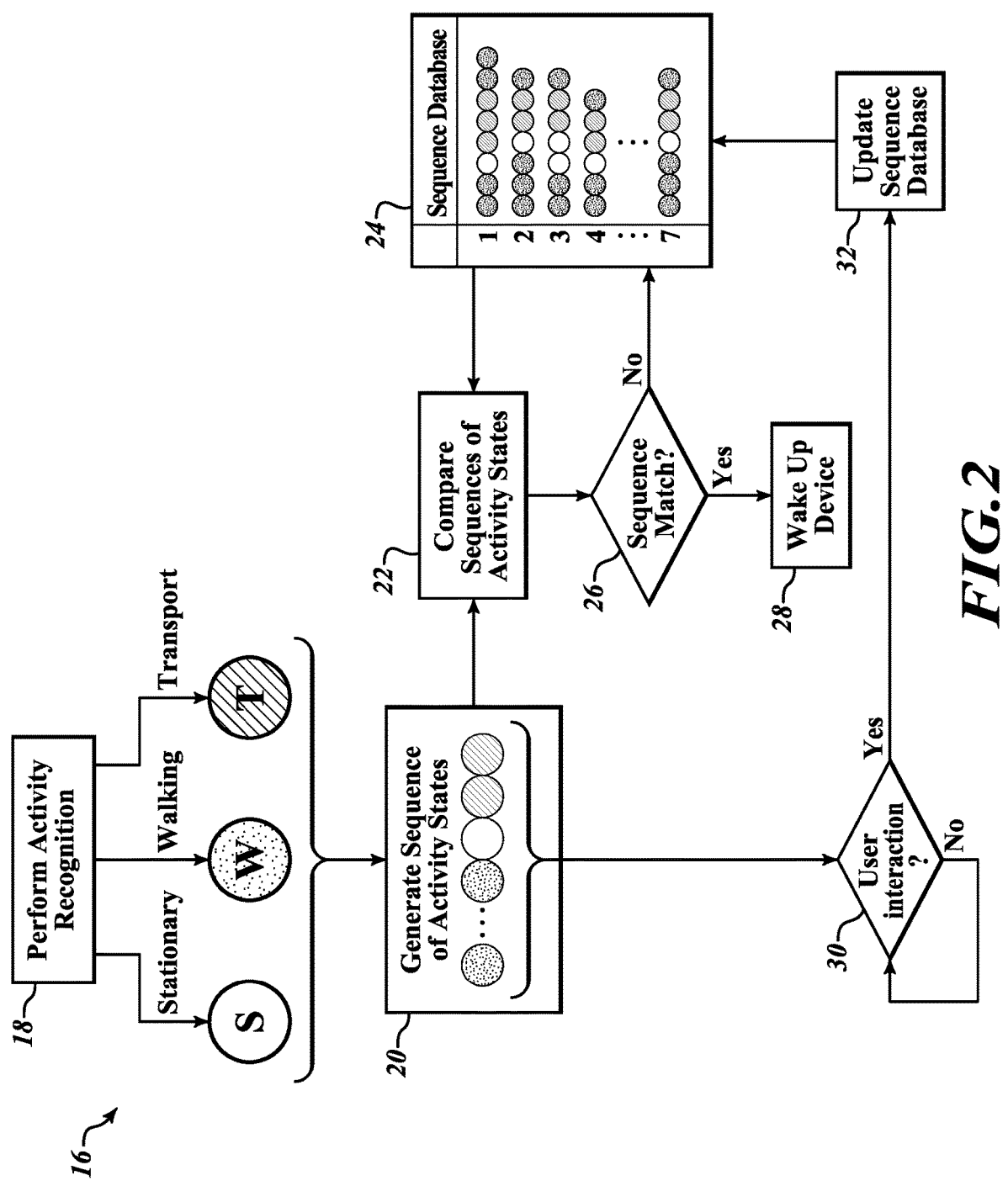
FIG. 2 is a flow diagram of a method for performing pattern recognition according to an embodiment disclosed herein.

FIG. 2 is a flow diagram of a method 16 for performing pattern recognition according to an embodiment disclosed herein.

The method 16 is executed by the device 10. More specifically, the method 16 is implemented as a program or a set of instructions that can be downloaded and stored in the onboard memory of the multi-sensor device 14, and is executed by the processor included in the multi-sensor device 14. It is also possible for the program for the method 16 to be stored in memory of the device 10, and executed by processor 12 of the device 10.

In one embodiment, the method 16 is performed when the device 10 is in an off state (e.g., the device is completely shut down) or an intermediate power state (e.g., a sleep, idle, or hibernate state). It is noted that the method 16 may be performed in the off and intermediate power states because the method 16 is performed by the multi-sensor device 14, which is a power-efficient, low-powered device that may remain on at all times.

In block 18, activity recognition is performed to detect or predict various activity states of the device 10. For example, a super still state (SS), a stationary state(S), a walking state (W), and a transport state (T) of the device 10 are detected. In the super still state, the device 10 remains completely still on a stable surface (e.g., in a bag left on a desk during the night). Stated differently, the device 10 has no movement. In the stationary state, the device 10 remains still with the possibility of some slight movement (e.g., in a bag held by a user waiting for a means of transportation). Stated differently, the device 10 has a determined amount movement (e.g., the device 10 has more movement than the super still state but less movement than the walking state and the transport state). In the walking state, a user is walking or running with the device 10. In the transport state, a user is traveling in a vehicle with the device 10. Other types of states are also possible.

Activity states are detected at determined intervals. For example, a single activity state is detected every minute. Other lengths of intervals are also possible.

Activity states are detected using human activity recognition (HAR), which classifies motion measurements detected by the multi-sensor device 14 as the super still state, the stationary state, the walking state, or the transport state. The motion measurements include, for example, acceleration measurements, angular velocity measurements, another type of motion measurement, or a combination thereof.

The multi-sensor device 14 may classify motion measurements as the super still state, the stationary state, the walking state, or the transport state using machine learning techniques, such as a decision tree, a neural network, and a support vector machine. For example, the multi-sensor device 14 computes a set of features to match current motion measurements to motion measurements expected for one of a plurality of pre-defined classes of targeted activities of interest. Such an approach utilizes labeled training data for each of the activities desired to be recognized in order to generate the classifier. Moreover, deep neural network models may be used and implemented for human activity recognition. Deep neural network models are capable of performing automatic feature learning from raw sensor data. Statistical models (e.g., Markov models or the like) may also be used.

In one embodiment, the multi-sensor device 14 extracts one or more features from the motion measurements; and classifies the motion measurements as the super still state, the stationary state, the walking state, or the transport state based on the extracted features. The features may include, for example, one or more of the following calculations: an energy calculation (e.g., a total energy of a motion measurement signal in a period of time), a variance calculation (e.g., a variance of a motion measurement signal in a period of time), a zero crossing calculation (e.g., a number of times a motion measurement signal crosses zero in a period of time), a peak-to-peak calculation (e.g., a difference between a maximum amplitude and a minimum amplitude of a motion measurement signal in a period of time), a peak count calculation (e.g., a total number of peaks in a motion measurement signal in a period of time), an mean calculation (e.g., an mean of a motion measurement signal in a period of time), a maximum calculation (e.g., a maximum of a motion measurement signal in a period of time), or a minimum calculation (e.g., a minimum of a motion measurement signal in a period of time). Other types of calculations are also possible.

In block 20, a current sequence or pattern of activity states is collected and built concurrently with block 18. The current sequence of activity states are subsequent activity states detected over time in block 18. Each new detected activity state detected in block 18 is added to the end of the sequence of activity states. The sequence of activity states represents a unique signature of a user's current routine.

As will be discussed in further detail below, a sequence is started to be generated upon detection of a transition from a super still state to another activity state other than the super still state (e.g., a stationary state, a walking state, or a transport state) after the super still state has been detected consecutively for a configurable amount of time (e.g., 2-4 hours). As a result, the first activity state of the sequence is the activity state other than the super still state that is detected immediately after a series of activity states that are consecutively detected as the super still state for a configurable amount of time.

In addition, the sequence is ended or stopped upon detection of a user interaction with the device 10. As a result, the last activity state of the sequence is the activity state detected immediately prior to the detection of the user interaction with the device 10. The current sequence of activity states continues to grow as time goes on until a user interaction with the device 10 is detected.

In block 22, the current sequence of activity states detected in block 20 is compared to a database sequence of activity states stored in a sequence database 24. The comparison determines whether the current sequence of activity states is substantially similar to the database sequence of activity states.

Block 22 may be performed concurrently with block 20 such that the comparison is made as the current sequence is being generated. In one embodiment, block 22 is performed in response to a new activity being added to the current sequence of activity states in block 22. Stated differently, block 22 is performed in response to the current sequence of activity states changing.

The sequence database 24 holds a plurality of database sequences of activity states. Each database sequence of activity states stored in the sequence database 24 is a previous pattern of activities performed by the user that terminated with the user starting to interact with the device 10. For example, a database sequence may represent a sequence of activities a user takes while traveling with the device 10 from home to work and turning on the device 10 at work. As such, multiple different routine sequences may be stored in the sequence database 24. As mentioned above, each sequence of activity states is started upon detection of a transition from a super still state to another activity state other than the super still state after the super still state has been detected consecutively for a configurable amount of time, and ends upon detection of a user interaction with the device 10. The updating of the database 24 will be discussed in further detail below.

Various techniques may be used to compare the current sequence of activity states detected to the plurality of database sequences of activity states stored in the sequence database 24. In general, the comparison combines the differences in duration of the sequences of activities, the differences in duration of each activity individually, and the uniqueness of the sequences of activities.

Figure 3:
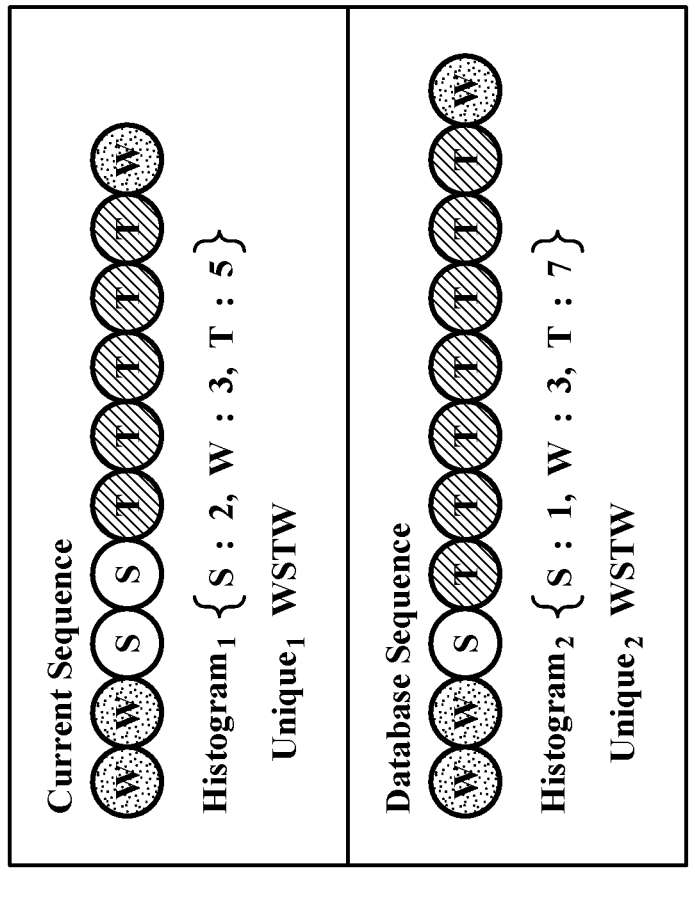
FIG. 3 shows examples of a current sequence of activity states and a database sequence of activity states according to an embodiment disclosed herein.

FIG. 3 shows examples of a current sequence of activity states $S_1$ and a database sequence of activity states $S_2$ according to an embodiment disclosed herein.

In one embodiment, the current sequence of activity states is compared to a database sequence of activity states using a duration distance calculation. The duration distance is an absolute difference between the durations or lengths (e.g., total number of activity states) of the current sequence of activity states and the database sequence of activity states, divided by the sum of the durations. Namely, the duration distance is calculated using the equation below:

$$\frac{|\text{length of } S_1 - \text{length of } S_2|}{\text{length of } S_1 + \text{length of } S_2}$$

where $S_1$ is the current sequence of activity states, and $S_2$ is the database sequence of activity states. For example, referring to FIG. 3, the duration distance is calculated as follows:

$$\frac{|10 - 11|}{10 + 11} \approx 0.048$$

Other metrics indicative of the differences in duration of the sequences of activities may be used.

In one embodiment, the current sequence of activity states is compared to a database sequence of activity states using a unique distance calculation. The unique distance is a normalized version of a metric sometimes referred to as Levenshtein distance. The unique distance is the number of changes (e.g., substitutions, insertions, or deletions) of activity states to turn the current sequence of activity states into the database sequence of activity states, normalized by the length of the longest sequence of the current sequence of activity states and the database sequence. Namely, the unique distance is calculated using the equation below:

$$\frac{\text{number of edits}}{\text{maximum length of } S_1 \text{ and } S_2}$$

where $S_1$ is the current sequence of activity states, and $S_2$ is the database sequence of activity states. For example, referring to FIG. 3, the unique distance is calculated as follows:

$$\frac{0}{4} = 0$$

Other metrics indicative of the uniqueness of the sequences of activities may be used.

In one embodiment, the current sequence of activity states is compared to a database sequence of activity states using a histogram distance calculation. The histogram distance is a sum of absolute differences between the total number of each activity state type for the current sequence of activity states and the database sequence of activity states, normalized by a sum of duration of the current sequence of activity states and the database sequence of activity states. Namely, the histogram distance is calculated using the equation below in case the types of activity states include, for example, a stationary state, a walking state, and a transport state:

$$\frac{|diff. \text{ for stationary state}| + |diff. \text{ for walking state}| + |diff. \text{ for transport state}|}{\text{length of } S_1 + \text{length of } S_2}$$

where $S_1$ is the current sequence of activity states, and $S_2$ is the database sequence of activity states. For example, referring to FIG. 3, the histogram distance is calculated as follows:

$$\frac{|2 - 1| + |3 - 3| + |5 - 7|}{10 + 11} \approx 0.143.$$

Other metrics indicative of the differences in duration of each activity individually may be used.

In block 26, subsequent to block 22, the device 10 determines whether the current sequence of activity states corresponds to the database sequence of activity states based on the comparison in block 22.

In one embodiment, the device 10 determines the current sequence of activity states corresponds to the database sequence of activity states in a case where the duration distance discussed above is less than a duration distance threshold, the unique distance discussed above is less than a unique distance threshold, the histogram distance discussed above is less than a histogram distance threshold, or a combination thereof.

In one embodiment, the device 10 determines the current sequence of activity states corresponds to the database sequence of activity states in a case where the duration distance is less than the duration distance threshold, the unique distance is less than the unique distance threshold, and the histogram distance is less than the histogram distance threshold.

In case the device 10 determines the current sequence of activity states does not correspond to the database sequence of activity states, another database sequence of activity states is retrieved from the sequence database 24, and the method 16 returns to block 22 where the current sequence of activity states is compared to the retrieved database sequence of activity states.

In case the device 10 determines the current sequence of activity states corresponds to the database sequence of activity states, the method 16 moves to block 28.

In block 28, the device 10 is awoken by being, for example, set to an on state (e.g., the device is powered on and ready to be used by a user). As a result, the user is able to interact with the device 10 without wait or setup time (e.g., power up, resource management, device configuration, processes runtime). In one embodiment, the multi-sensor device 14 instructs the processor 12 to set the device 10 to the on state. The method 16 may then terminate until the next time the device 10 is set to an off state or an intermediate state, in which case the method 16 may be performed again.

As discussed above, the current sequence of activity states is being generated in block 20. Concurrently with block 20, the device 10 monitors whether a user starts interacting with the device 10 in block 30. A user interaction may be any action in which a user interacts or uses the device 10. For example, the device 10 may monitor whether a user has opened a lid of the device 10, pressed a key of the device 10, typed on the keyboard of the device 10, plugged the device 10 into a docking station plugging, pressed the power button of the device 10, etc.

In case the device 10 determines no user is interacting with the device 10, the method 16 returns to block 30 in order to continue to monitor for the user interaction.

In case the device 10 determines a user has started interacting with the device 10, the method 16 moves to block 32.

In block 32, generation of the current sequence in block 20 is stopped and the sequence database 24 is updated. Namely, the current sequence of activity states generated in block 20 is saved to the sequence database 24. As a result, the current sequence of activity states will be used for comparison in subsequent executions of block 22. The method 16 may then terminate until the next time the device 10 is set to an off state or an intermediate state, in which case the method 16 may be performed again.

In one embodiment, the oldest database sequence stored in the sequence database 24 is removed when the sequence database 25 is updated. Stated differently, the first, oldest database sequence stored in the sequence database 24 is removed in response to a new database sequence being stored in the sequence database 24.

As a result of blocks 20, 30, and 32, each database sequence of activity states stored in the sequence database 24 is a pattern of activities performed by the user that terminates with the user starting to interact with the device. More specifically, the first activity state of each of the database sequences is an activity state other than a super still state that is detected immediately after a series of activity states that are consecutively detected as the super still state for a configurable amount of time, and the last activity state of each of the database sequences is the activity state that is detected immediately prior to the detection of a user interaction with the device 10.

Figure 4:
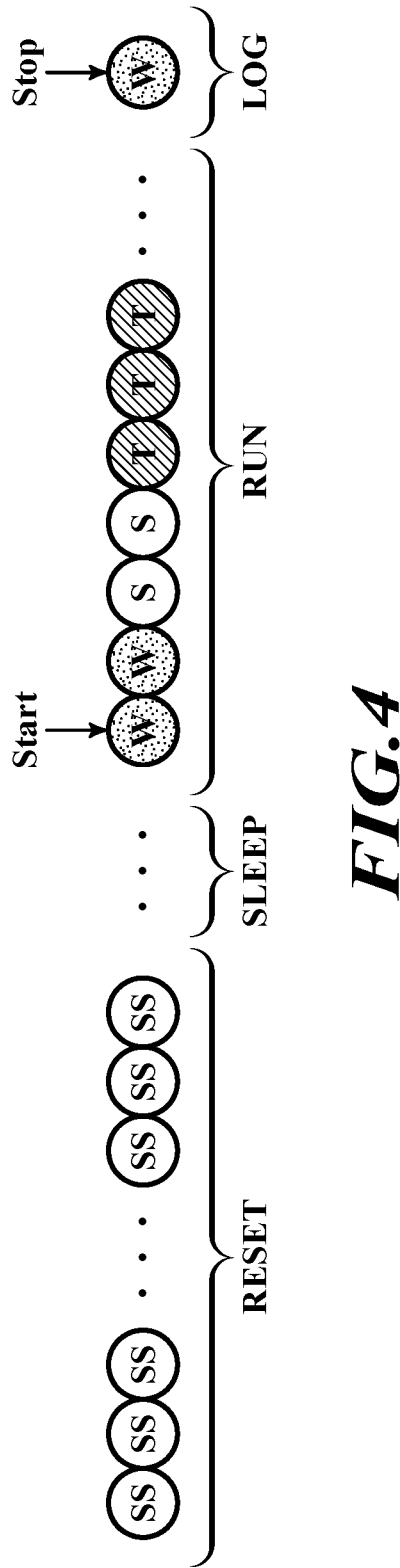
FIG. 4 shows activity states according to an embodiment disclosed herein.

As an example, FIG. 4 shows activity states according to an embodiment disclosed herein. The activity states are activity states detected in block 18 as discussed above with respect to FIG. 2.

In a case where a plurality of subsequent super still states is detected over an extended period of time (e.g., 2-4 hours), the method 16 is placed in a reset stage. In the reset stage, the sequence of activity states collected in block 20 is erased. The reset stage typically occurs when the device 10 is no longer in use overnight.

Subsequently, the method 16 is placed into a sleep stage. In the sleep stage, the device 10 continues to monitor the activity states. The method 16 continues to be in the sleep stage as long as the super still state is being detected, and waits for a first activity state that differs from the super still state before entering into a run stage.

In response to detecting the first activity state that differs from the super still state, the method 16 is placed into a run stage. In the run stage, the current sequence of activity states starts to be collected in block 20 as discussed above with respect to FIG. 2. Stated differently, the current sequence is started upon detection of a transition from a super still state to another activity state other than the super still state (e.g., a walking state as shown in FIG. 4) after the super still state has been detected consecutively for a configurable amount of time. During the run stage, each new detected activity state is appended to the end of the current sequence. The method 16 continues to be in the run stage until a user starts interacting with the device 10.

The method 16 is placed into a log state in response to a user starting to interact with the device 10. In the log state, the current sequence of activity states stops to be collected in block 20 and is stored in the sequence database 24 in blocks 30 and 32, as discussed above with respect to FIG. 2.

Stated differently, the current sequence is ended and stored upon detection of a user interaction with the device 10.

Variability of different user routines are accounted for by tuning various parameters of the device 10. For example, the total number of database sequences stored in the sequence database 24 may be adjusted, different types of comparison algorithms in block 22 of the method 16 may be used, the threshold values used in the comparison algorithms in block 22 of the method 16 may be adjusted, and priority weights may be assigned to different types of activity states in the comparison algorithms in block 22 (e.g., walking or transport states may be assigned a high priority than stationary states). As a result, the method 16 is able to detect various different user routines (e.g., as a user travelling with the device 10 from home to work), as well as adjust for unexpected events (e.g., unexpected delays in the user's schedule, traffic, vacations, and schedule changes).

The various embodiments disclosed herein provide user routine recognition for customizing transitions between power states. A device is awakened in advance by predicting when a user typically starts interacting with the device. As a result, the user is able to interact with the device without wait or setup time. As activity states are detected with human activity recognition, user routines are dynamically learned on the device based on user activity patterns, instead of user-defined scheduled routines dependent on absolute time information. Further, human activity recognition allows for detection of multiple different user routines that change over time and are robust to variability in activity patterns. In addition, lightweight routine comparison algorithms are used to compare current routines with previous routines stored in a database, without the use of intensive machine learning algorithms that utilize model training.

A device may be summarized as including: a motion sensor configured to generate motion measurements; and a processor coupled to the motion sensor, the processor configured to: detect a plurality of activity states based on the motion measurements; generate a current sequence of activity states based on the plurality of activity states; compare the current sequence of activity states to a database sequence of activity states stored in a database; and set the device to an on state in a case where the current sequence of activity states corresponds to the database sequence of activity states.

The plurality of activity states may include a stationary state in which the device has a determined amount of movement, a walking state in which a user is walking with the device, and a transport state in which the user is traveling in a vehicle with the device.

The database sequence of activity states may be a sequence that terminates with a user interacting with the device.

The database sequence of activity states may be a sequence that starts upon detection of a transition from a super still state in which the device remains still to another activity state after the super still state has been detected consecutively for a determined amount of time, and the database sequence of activity states may be a sequence that terminates with a user interacting with the device.

The processor may be configured to determine the current sequence of activity states corresponds to the database sequence of activity states based on a duration distance, a unique distance, or a histogram distance.

The processor may be configured to determine the current sequence of activity states corresponds to the database sequence of activity states in a case where a duration distance is below a first threshold value, a unique distance is below a second threshold value, and a histogram distance is below a third threshold value.

The plurality of activity states may include a super still state in which the device remains still, a stationary state in which the device has a determined amount of movement, a walking state in which a user is walking with the device, and a transport state in which the user is traveling in a vehicle with the device, and the current sequence of activity states may be a sequence that starts upon detection of a transition from the super still state to another activity state after the super still state has been detected consecutively for a determined amount of time.

The processor may be configured to store the current sequence of activity states in the database in a case where a user interacts with the device.

The current sequence of activity states may be activity states of the plurality of activity states detected in sequential order.

A method may be summarized as including: generating motion measurements of a device; detecting a plurality of activity states based on the motion measurements; generating a current sequence of activity states based on the plurality of activity states; comparing the current sequence of activity states to a database sequence of activity states stored in a database; and setting the device to an on state in a case where the current sequence of activity states corresponds to the database sequence of activity states.

The plurality of activity states may include a stationary state in which the device has a determined amount of movement, a walking state in which a user is walking with the device, and a transport state in which the user is traveling in a vehicle with the device.

The method may further include: detecting a transition from a super still state in which the device remains still; starting generation of the database sequence of activity states in response to detecting the transition from the super still state after the super still state has been detected consecutively for a determined amount of time; detecting a user interacting with the device; terminating the generation of the database sequence of activity states in response to detecting the user interacting with the device; and storing the database sequence of activity states in the database in response to terminating the generation of the database sequence of activity states.

The method may further include determining the current sequence of activity states corresponds to the database sequence of activity states based on a duration distance, a unique distance, or a histogram distance.

The method may further include determining the current sequence of activity states corresponds to the database sequence of activity states in a case where a duration distance is below a first threshold value, a unique distance is below a second threshold value, and a histogram distance is below a third threshold value.

The plurality of activity states may include a super still state in which the device remains still, a stationary state in which the device has a determined amount of movement, a walking state in which a user is walking with the device, and a transport state in which the user is traveling in a vehicle with the device, and the method may further include generating the current sequence of activity states in response to detecting a transition from the super still state to another activity state after the super still state has been detected consecutively for a determined amount of time.

The method may further include storing the current sequence of activity states in the database in case where a user interacts with the device.

A method may be summarized as including: detecting a plurality of activity states of a device; generating a current sequence of activity states that includes activity states of the plurality of activity states; determining whether or not the current sequence of activity states corresponds to a previous sequence of activity states that terminated with a user interacting with the device; setting the device to an on state in a case where the current sequence of activity states corresponds to the previous sequence of activity states; and determining whether or not the current sequence of activity states corresponds to another previous sequence of activity states that terminated with the user interacting with the device in a case where the current sequence of activity states does not correspond to the previous sequence of activity states.

The plurality of activity states may include a stationary state in which the device has a determined amount of movement, a walking state in which the user is walking with the device, and a transport state in which the user is traveling in a vehicle with the device.

The plurality of activity states may include a super still state in which the device remains still, a stationary state in which the device has a determined amount of movement, a walking state in which the user is walking with the device, and a transport state in which the user is traveling in a vehicle with the device, and the method may further include generating the current sequence of activity states in response to detecting a transition from the super still state to another activity state after the super still state has been detected consecutively for a determined amount of time.

The method may further include storing the current sequence of activity states in a database in case where the user interacts with the device, the previous sequence of activity states being stored in the database.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
a motion sensor configured to generate motion measurements; and
a processor coupled to the motion sensor, the processor configured to:
detect a plurality of activity states based on the motion measurements, the detected plurality of activity states including a stationary state in which the device has a determined amount of movement, a walking state in which a user is walking with the device, and a transport state in which the user is traveling in a vehicle with the device;
generate a current sequence of activity states based on the detected plurality of activity states;
compare the current sequence of activity states to a database sequence of activity states stored in a database; and
set the device to an ON state in a case where the current sequence of activity states corresponds to the database sequence of activity states.

2. The device of claim 1 wherein the database sequence of activity states is a sequence that terminates with the user interacting with the device.

3. The device of claim 1 wherein
the database sequence of activity states is a sequence that starts upon detection of a transition from a super still state in which the device remains still to another activity state after the super still state has been detected consecutively for a determined amount of time, and
the database sequence of activity states is a sequence that terminates with the user interacting with the device.

4. The device of claim 1 wherein the processor is configured to determine the current sequence of activity states corresponds to the database sequence of activity states based on a duration distance, a unique distance, or a histogram distance.

5. The device of claim 1 wherein the processor is configured to determine the current sequence of activity states corresponds to the database sequence of activity states in a case where a duration distance is below a first threshold value, a unique distance is below a second threshold value, and a histogram distance is below a third threshold value.

6. The device of claim 1 wherein
the detected plurality of activity states includes a super still state in which the device remains still, and
the current sequence of activity states is a sequence that starts upon detection of a transition from the super still state to another activity state after the super still state has been detected consecutively for a determined amount of time.

7. The device of claim 1 wherein the processor is configured to:
store the current sequence of activity states in the database in a case where the user interacts with the device.

8. The device of claim 1 wherein the current sequence of activity states are the detected plurality of activity states arranged in sequential order.

9. A method, comprising:
generating motion measurements of a device;
detecting a plurality of activity states based on the motion measurements, the detected plurality of activity states including a stationary state in which the device has a determined amount of movement, a walking state in which a user is walking with the device, and a transport state in which the user is traveling in a vehicle with the device;
generating a current sequence of activity states based on the detected plurality of activity states;
comparing the current sequence of activity states to a database sequence of activity states stored in a database; and
setting the device to an ON state in a case where the current sequence of activity states corresponds to the database sequence of activity states.

10. The method of claim 9, further comprising:
detecting a transition from a super still state in which the device remains still;
starting generation of the database sequence of activity states in response to detecting the transition from the super still state after the super still state has been detected consecutively for a determined amount of time;
detecting the user interacting with the device;
terminating the generation of the database sequence of activity states in response to detecting the user interacting with the device; and storing the database sequence of activity states in the database in response to terminating the generation of the database sequence of activity states.

11. The method of claim 9, further comprising:

determining the current sequence of activity states corresponds to the database sequence of activity states based on a duration distance, a unique distance, or a histogram distance.

12. The method of claim 9, further comprising:

determining the current sequence of activity states corresponds to the database sequence of activity states in a case where a duration distance is below a first threshold value, a unique distance is below a second threshold value, and a histogram distance is below a third threshold value.

13. The method of claim 9 wherein the detected plurality of activity states includes a super still state in which the device remains still, and the method further includes generating the current sequence of activity states in response to detecting a transition from the super still state to another activity state after the super still state has been detected consecutively for a determined amount of time.

14. The method of claim 9, further comprising:

storing the current sequence of activity states in the database in case where the user interacts with the device.

15. A method, comprising:

generating motion measurements of a device;

detecting a plurality of activity states of the device based on the motion measurements, the detected plurality of activity states including a super still state in which the device remains still, a stationary state in which the device has a determined amount of movement, a walking state in which a user is walking with the device, and a transport state in which the user is traveling in a vehicle with the device;

generating, in response to detecting a transition from the super still state to another activity state after the super still state has been detected consecutively for a determined amount of time, a current sequence of activity states that includes activity states of the detected plurality of activity states;

determining whether or not the current sequence of activity states corresponds to a database sequence of activity states that terminates with the user interacting with the device;

setting the device to an ON state in a case where the current sequence of activity states corresponds to the database sequence of activity states; and determining whether or not the current sequence of activity states corresponds to another database sequence of activity states that terminated with the user interacting with the device in a case where the current sequence of activity states does not correspond to the database sequence of activity states.

16. The method of claim 15, further comprising:

storing the current sequence of activity states in a database in case where the user interacts with the device.

* * * * *